United States Patent [19]
Ide

[11] Patent Number: 5,844,498
[45] Date of Patent: Dec. 1, 1998

[54] PAGING RECEIVER WITH A MESSAGE SELECTION CIRCUIT

[75] Inventor: Motoki Ide, Tokyo, Japan

[73] Assignee: NEC Corporation, Tokyo, Japan

[21] Appl. No.: 487,655

[22] Filed: Jun. 7, 1995

Related U.S. Application Data

[63] Continuation of Ser. No. 13,996, Feb. 5, 1993, abandoned, which is a continuation of Ser. No. 618,852, Nov. 28, 1990, abandoned, which is a continuation-in-part of Ser. No. 270,321, Nov. 14, 1988, abandoned.

[30] Foreign Application Priority Data

Nov. 18, 1987 [JP] Japan .................................... 1-286751

[51] Int. Cl.$^6$ ...................................................... G08B 5/22
[52] U.S. Cl. ................................ 340/825.44; 340/825.26; 340/825.27
[58] Field of Search ........................... 340/311.1, 825.26, 340/825.27, 825.44, 825.47, 825.48; 364/408

[56] References Cited

U.S. PATENT DOCUMENTS

| | | |
|---|---|---|
| Re. 32,365 | 3/1987 | Sebestyen . |
| 4,382,256 | 5/1983 | Nagata . |
| 4,385,295 | 5/1983 | Willard et al. . |
| 4,392,135 | 7/1983 | Ohyagi . |
| 4,417,246 | 11/1983 | Agnor et al. ........................ 340/825.44 |
| 4,438,433 | 3/1984 | Smoot et al. . |
| 4,473,824 | 9/1984 | Claytor . |
| 4,477,807 | 10/1984 | Nakajima et al. . |
| 4,742,516 | 5/1988 | Yamaguchi ........................ 340/825.44 |
| 4,755,816 | 7/1988 | Deluca . |
| 4,783,654 | 11/1988 | Ichikawa . |
| 4,818,987 | 4/1989 | Ide et al. . |
| 4,829,466 | 5/1989 | Davis et al. .......................... 340/311.1 |
| 4,845,491 | 7/1989 | Fascenda et al. .................. 340/825.44 |
| 4,873,519 | 10/1989 | Matai et al. ....................... 340/825.44 |
| 4,894,649 | 1/1990 | Davis ................................. 340/825.44 |
| 4,942,616 | 7/1990 | Linstroth et al. ....................... 364/408 |
| 5,045,848 | 9/1991 | Fascenda ............................ 340/825.26 |
| 5,049,874 | 9/1991 | Ishida et al. ....................... 340/825.44 |
| 5,297,032 | 3/1994 | Trojan et al. ...................... 340/825.26 |

FOREIGN PATENT DOCUMENTS

| | | |
|---|---|---|
| 0086255 | 8/1983 | European Pat. Off. . |
| 0081932 | 5/1984 | Japan . |

OTHER PUBLICATIONS

Watch Pager, Motorola Inc., dated 1990, p. 3.

*Primary Examiner*—Michael Horabik
*Assistant Examiner*—Edward Merz
*Attorney, Agent, or Firm*—Sughrue, Mion, Zinn, Macpeak & Seas, PLLC

[57] ABSTRACT

A radio paging receiver receives a paging signal including at least a paging number signal and a message signal which follows the paging number signal. The receiver detects a paging signal which is intended therefor, by comparing the received paging number signal with a pre-stored paging number signal. Upon detection of the intended paging signal, the receiver searches the received message signal for a specific message signal which satisfies a condition that is pre-stored in a RAM of the receiver. If the receiver finds a message signal satisfying the pre-stored condition, it displays the message signal and/or enables at least one of a speaker, an LED indicator and a vibrator according to notification information that is also pre-stored in the RAM. The message searching condition and the notification information are pre-stored in the RAM through a keyboard coupled to the receiver.

14 Claims, 7 Drawing Sheets

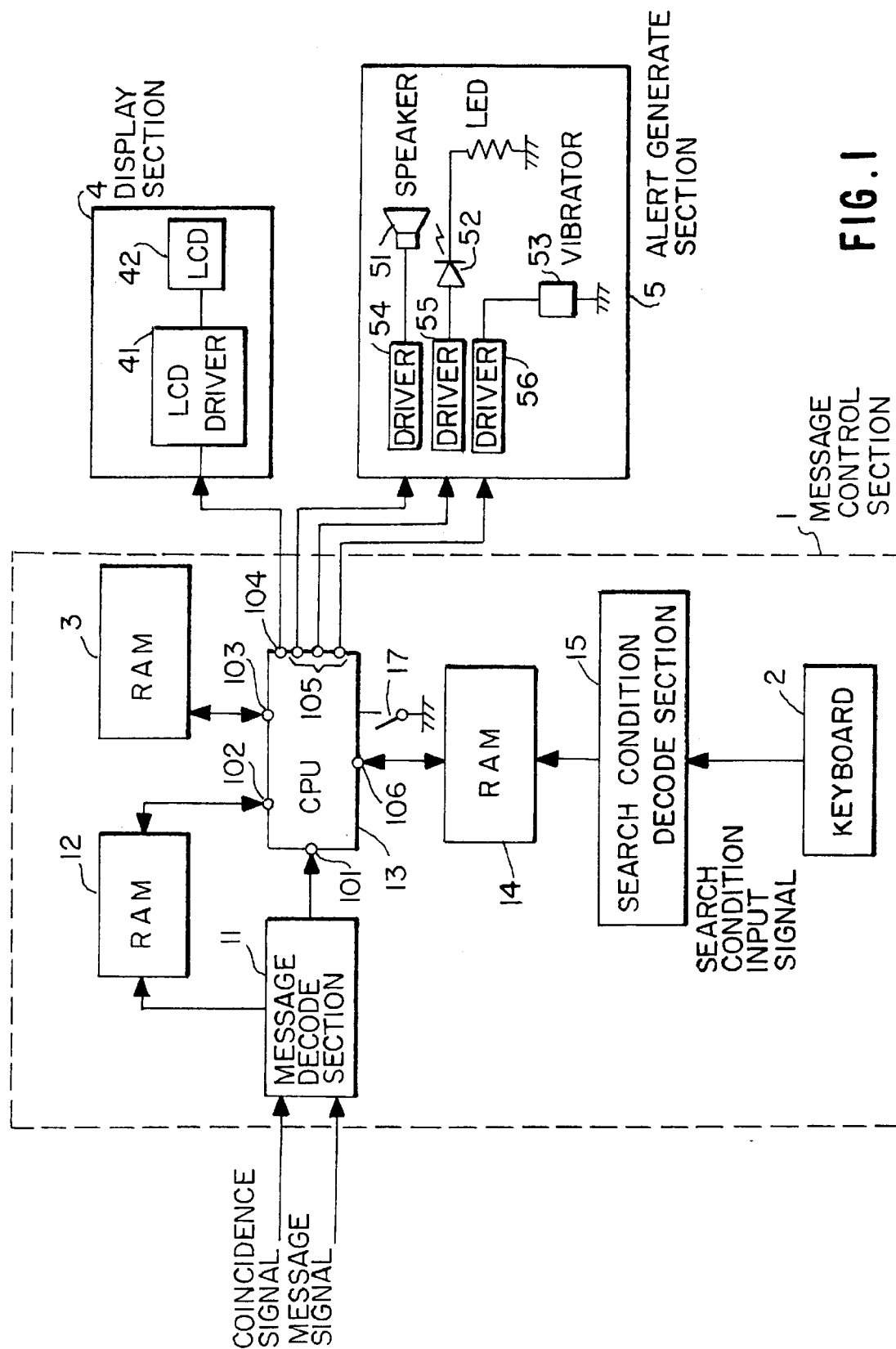

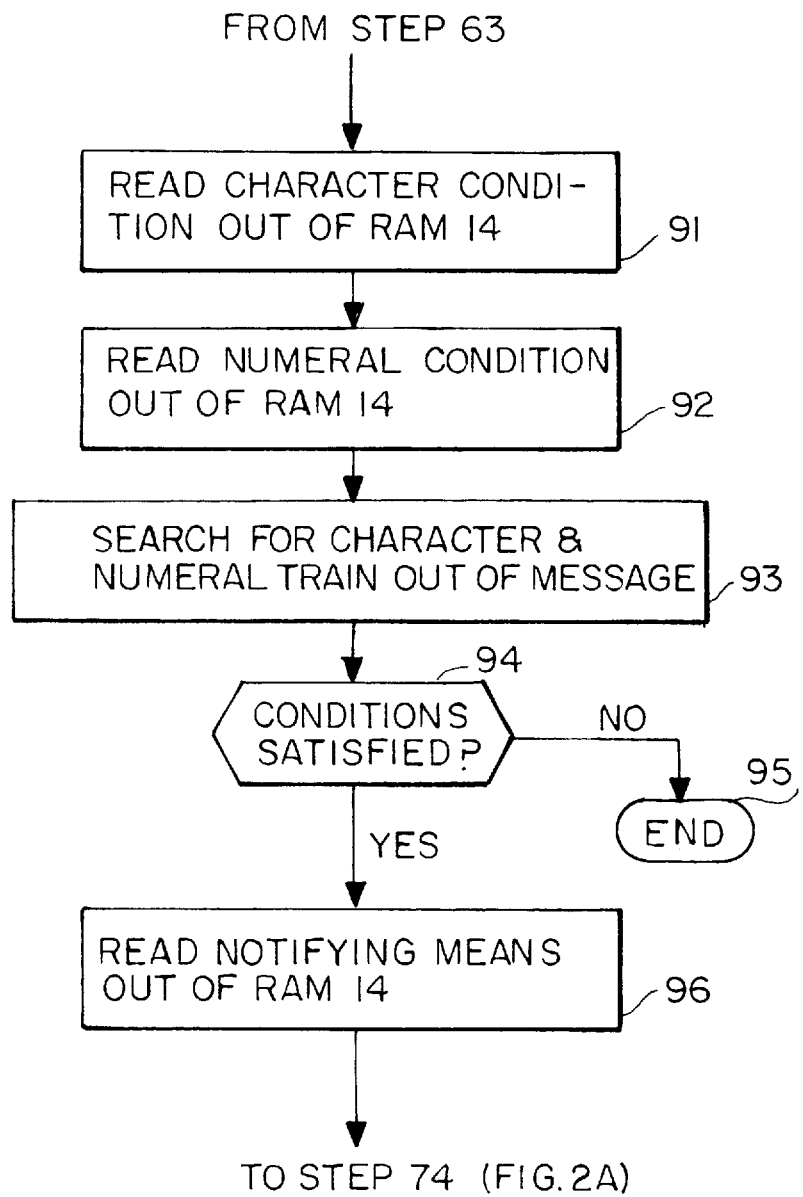

FIG.3A

| NETWORK   TROUBLE   OCCURRED |

| TROUBLE |  FIG.3B

FIG.4A

------NEC$151✴TORAY$123✴------

| NEC ≧150 |  FIG.4B

FIG. 6A

| FLAG | N | E | C | CHECK BITS (10BITS) | EVEN PARITY (1BIT) |
|---|---|---|---|---|---|
| 1 | 0111001 | 1010001 | 110000 | XXXXXXXXXX | X |

FIG. 6B

| FLAG | C | $ | I | 5 | CHECK BITS | EVEN PARITY |
|---|---|---|---|---|---|---|
| 1 | — | 0010010 | 0001110 | 10101 | XXXXXXXXX | X |

FIG. 6C

| FLAG | 5 | I | * | T | CHECK BITS | EVEN PARITY |
|---|---|---|---|---|---|---|
| 1 | 10 | 0001110 | 0101010 | 001010 | XXXXXXXXX | X |

5,844,498

PAGING RECEIVER WITH A MESSAGE SELECTION CIRCUIT

This is a Continuation of application Ser. No. 08/013,996 filed Feb. 5, 1993 which is a Continuation of application Ser. No. 07/618,852 filed Nov. 28, 1990 which is a continuation in part of application Ser. No. 07/270,321, filed Nov. 14, 1988, all abandoned.

BACKGROUND OF THE INVENTION

The present invention relates to a paging receiver, and more particularly, to a paging receiver including a message selecting circuit.

Today, a paging receiver is extensively used not only for receiving an exclusive call but for receiving common information such as stock information. Specifically, the users of paging receivers own a common paging number for receiving a common information service. Stock information or similar common information transmitted from the service offerer (firm) is received by all of the receivers to which the common paging number is assigned.

A paging receiver used in the above-described manner has various drawbacks when called frequently at relatively short intervals such as for a stock price, exchange rate or similar information service, as enumerated below:

(1) Although a paging receiver of the type having a function of producing an alert in response to each call may promote timely confirmation of desired data, it requires troublesome manipulations for confirmation when applied to a system which originates a call every 30 seconds, for example. More specifically, it is necessary for the user of the receiver to see if common information received is the desired information every time such information arrives;

(2) Conversely, a paging receiver of the type memorizing only the latest information or all the information without producing any alert is apt to cause a person to miss the chance to see the time when the stock price has gone up above an expected level, for example.

SUMMARY OF THE INVENTION

It is therefore an object of the present invention to provide a paging receiver which allows a user of the receiver to readily select received common information and thereby to see only desired information immediately.

A paging receiver of the present invention comprises a receiving section for receiving a paging number and a message which follows the paging number to produce a received paging number and a received message signal, respectively, a paging number storing section for storing the paging number assigned to the receiver, a paging number detecting section for comparing the received paging number and the paging number assigned to the receiver, if the two paging numbers are identical, producing a coincidence signal and outputting the received message signal, a message decoding section for decoding, in response to the coincidence signal, the received message signal and generating a decoded message signal, a search condition setting section for setting a search condition and notifying means associated with the search condition for producing a notifying signal, a search condition decoding section for decoding the set search condition and the set notifying means to produce a decoded search condition signal and a decoded notifying means signal, respectively, a message selecting section for searching the decoded message signal for a message signal which satisfies a condition indicated by the decoded search condition signal to produce a searched message signal and for generating the notifying signal which is indicated by the notifying means signal, a searched message storing section for storing the searched message signal, a notification control section for, in response to the searched message signal and the notifying signal, generating a first drive signal and, in response to the searched message signal generating a second drive signal, a display section for displaying the searched message signal in response to any of the first and second drive signals, and an alert generating section for generating an alert in response to the first drive signal. The receiver preferably comprises a switch for commanding selection of one of the first and second drive signals which are generated by the notification control section.

BRIEF DESCRIPTION OF THE DRAWINGS

The above and other objects, features and advantage of the present invention will become more apparent from the following detailed description taken with the accompanying drawings in which:

FIG. 1 is a schematic block diagram showing a paging receiver embodying the present invention;

FIGS. 2A and 2B are flowcharts demonstrating the operation of a CPU included in the receiver of FIG. 1;

FIGS. 3A and 3B show an example of character information and an example of character search condition, respectively;

FIGS. 4A and 4B show an example of alphanumeric information and an example of alphanumeric search condition, respectively;

FIGS. 6A to 6C show the alphanumeric information of FIG. 4A which is applied to the code format of FIGS. 5A and 5B;

DETAILED DESCRIPTION OF THE PREFERRED EMBODIMENT

Figure 7:
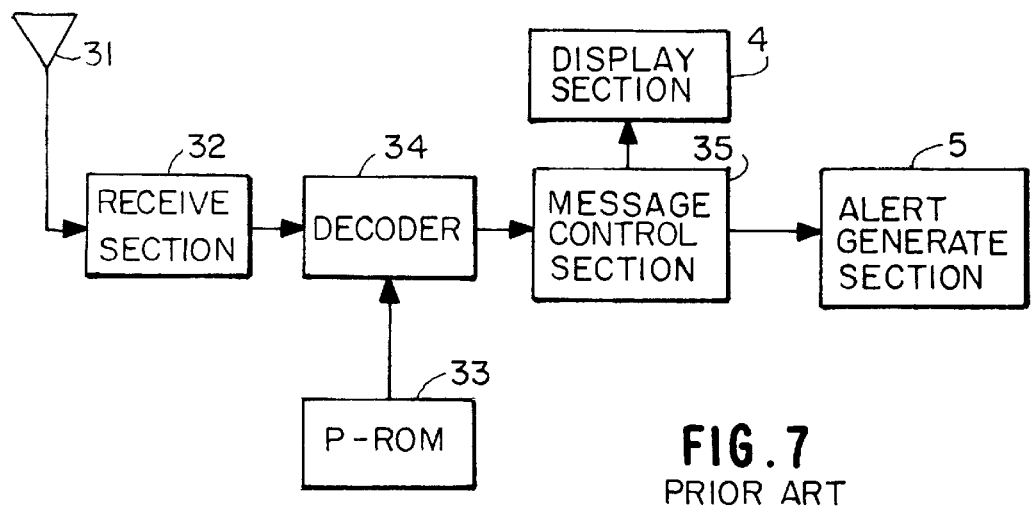
FIG. 7 is a schematic block diagram showing a paging receiver in general use.
Figure 8:
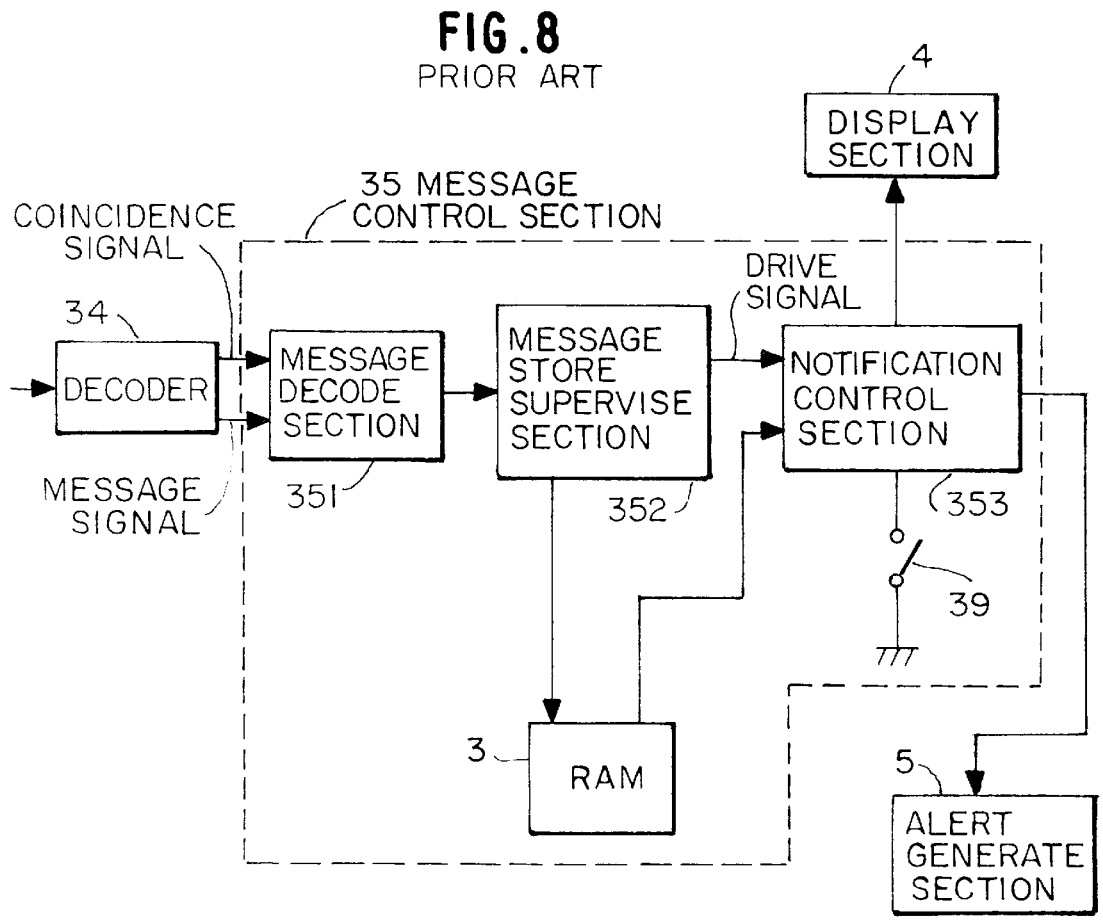
FIG. 8 is a schematic block diagram showing details of a message control section which is included in the prior art paging receiver.

To better understand the present invention, a brief reference will be made to a prior art paging receiver, shown in FIGS. 7 and 8. The prior art paging receivers shown in FIGS. 7 and 8 are well known as disclosed in, for example, U.S. Pat. Nos. 4,713,659 and 4,249,165.

An ordinary paging receiver shown in FIG. 7 includes a receiving section 32 for demodulating a signal coming in through an antenna 31, and a Programmable-Read Only Memory (PROM) 33 for storing a paging number assigned to the receiver. An ID decoder 34 detects a paging signal in synchronism with a frame synchronizing signal which is contained in the demodulated output of the receiving section 32, and decodes the paging signal to produce a decoded paging number. Reading the receivers's paging number out of the PROM 33, the decoder 34 produces a coincidence signal if it is identical with the decoded paging number. Then, the decoder 34 transfers a message signal which follows the paging signal to a message control section 35. In response, the message control section 35 delivers display and alert drive signals to a display section 4 and to an alert generating section 5, respectively. Upon reception of the display drive signal, the display section 4 displays a message signal which follows the paging number. Upon reception of the alert drive signal, the section 5 generates an alert signal.

Referring to FIG. 8, a specific construction of message control section 35 of the prior art paging receiver is shown. In response to the coincidence signal from the decoder 35, a message decoding section 351 decodes the message signal and then supplies the decoded signal to a message store supervising section 352 at which the decoded sinal is stored in a predetermined format. At the same time, a notification drive signal is fed from the message store supervising section 352 to a notification control section 353. In response, the control section 353 triggers the display section 4 and the alert generating section 5 depending upon the status of a switch 39. More specifically, the display of a message on the display section 4 and the generation of an alert by the alert generating section 5 depends upon the operation of the switch 39. The reference numeral 3 designates random access memory (RAM) for storing messages as needed. However, the prior art paging receiver with such a message control section is incapable of allowing the user to adopt or reject the message signal as desired, as discussed earlier.

Referring to FIG. 1, a paging receiver embodying the present invention includes a message control section 1 which comprises a message decode section 11, a central processing unit (CPU) 13, a read-out switch 17, a buffer RAM 12 for temporarily storing a message, a RAM 3 for storing a searched message and the associated alert means, a RAM 14 for storing a search condition and alert means (devices), which will be a search condition decode section 15, and a keyboard 2. The CPU 13 executes an operation flow shown in FIGS. 2A and 2B which will be discussed later. The CPU 13 is connected through an input-output ports 101, 102, 103, 104, 105 and 106 to the section 11, the RAM 12, the RAM 3, a display section 4, an alert generate section 5 and the RAM 14, respectively.

The display section 4 is comprised of a liquid crystal display (LCD) 42 and an LCD driver 41 while the alert generating section 5 is composed of a speaker 51, a speaker driver 54, a light emitting diode (LED) 52, an LED driver 55, a vibrator 53 and a vibrator driver 56.

It is to be noted that the message control section 1 is proceeded by circuitry which includes the antenna 31, receiving section 32, P-ROM 33 and ID decoder 34 as shown in FIG. 7.

In operation, the message decoding section 11 decodes a message signal in response to a coincidence signal which is outputted by the ID decoder 34 which precedes the message decoding section 11. The decoded message signal is temporarily stored in the RAM 12. The message signal lodged in the RAM 12 is searched by the CPU 13 according to a search condition which has been stored in the RAM 14 beforehand in a predetermined format.

The search condition is entered on the keyboard 2 by the user as needed. The search condition is decoded by the search condition decoding section 15 and then stored in the RAM 14. Alert generating means such as speaker means, LED means or vibrator means is set via the keyboard 2 in addition to the search condition. Further entered on the keyboard 2 is whether or not to store a received message. The result of these settings are also decoded by the search condition decoding section 15 and then stored in the RAM 14.

The timing for the CPU 13 to begin a search is provided by the message decoding section 11 in the form of a search start signal. More specifically, when messages are to be searched one after another, the search start signal is outputted timed to the entry of a message in the message decoding section 11; when they are to be searched on a group basis, the search start signal is produced timed to the end of a sequence of messages.

The CPU 13 ends the condition search according to the condition set beforehand and directly delivers the result of search and a signal which designates notifying means associated with the result of search to the display and alert generate sections 4 and 5. When a message store request is entered, the CPU 13 stores the searched message and the associated alert means in the RAM 3.

Upon reception of the result of search and the signal designating a particular notifying means, the CPU 13 applies a first drive signal to the display section 4 to the alert generating section 5 with no regard to the status of a message read-out switch 39.

Nevertheless, when the searching operation is not carried out and the switch 17 is conditioned to deliver a message read-out command, the CPU 13 reads out the content of the RAM 3 and, based on it, delivers a second drive signal only to the display section 4.

Any desired kind of combination of the display section 4 and alert generating section 5 which are responsive to the first drive signal may be entered on the keyboard 2. In response to the first or second drive signal, the display section 4 displays a message on the LCD 42 via the LCD driver 41.

The alert generating section 5 which has received the first drive signal generates an alert. More specifically, the CPU 13 provides at least one of the speaker 51, LED 52 and vibrator 53 receives, via the associated driver 54, 55 or 56, with the first drive signal which is entered through the keyboard 2 and designates the at least one of the alerting means 51, 52 and 53. Upon reception of the first drive signal, the designated alerting means generates an alert.

As stated earlier, the keyboard 2 is provided for the following purposes:

(1) setting a search condition (inclusive of no search condition) and notifying means;

(2) setting whether or not to store a message;

(3) setting ON/OFF of notifying means (alert generating section 5); and (4) setting ON/OFF of display (display section 4).

While keys for implementing the settings (3) and (4) have to be provided on a casing of the receiver the purposes (1) and (2) may either be provided on the casing or be implemented by a keyboard of an external terminal as desired. When use is made of an external terminal, it is of course necessary to provide the receiver body with a terminal for connection. By operating such a keyboard, the content of the RAM 14 can be changed. The previously mentioned message read-out key 17 is provided on the receiver casing independently of the keys of the keyboard 2.

The operation of the CPU 13 shown in FIG. 1 will now be described with reference to FIGS. 2A and 2B. Examples of searches which the CPU 13 basically performs are as follows:

(1) determining whether or not a specified character train is included in a message;

(2) evaluating a value represented by a numerical data train which is included in a message; and (3) searching for a specified character train and evaluating a value of a numerical data train which immediately follows the character train.

Operation flow representative of the above-mentioned three example will be described hereinafter.

Figure 2A:
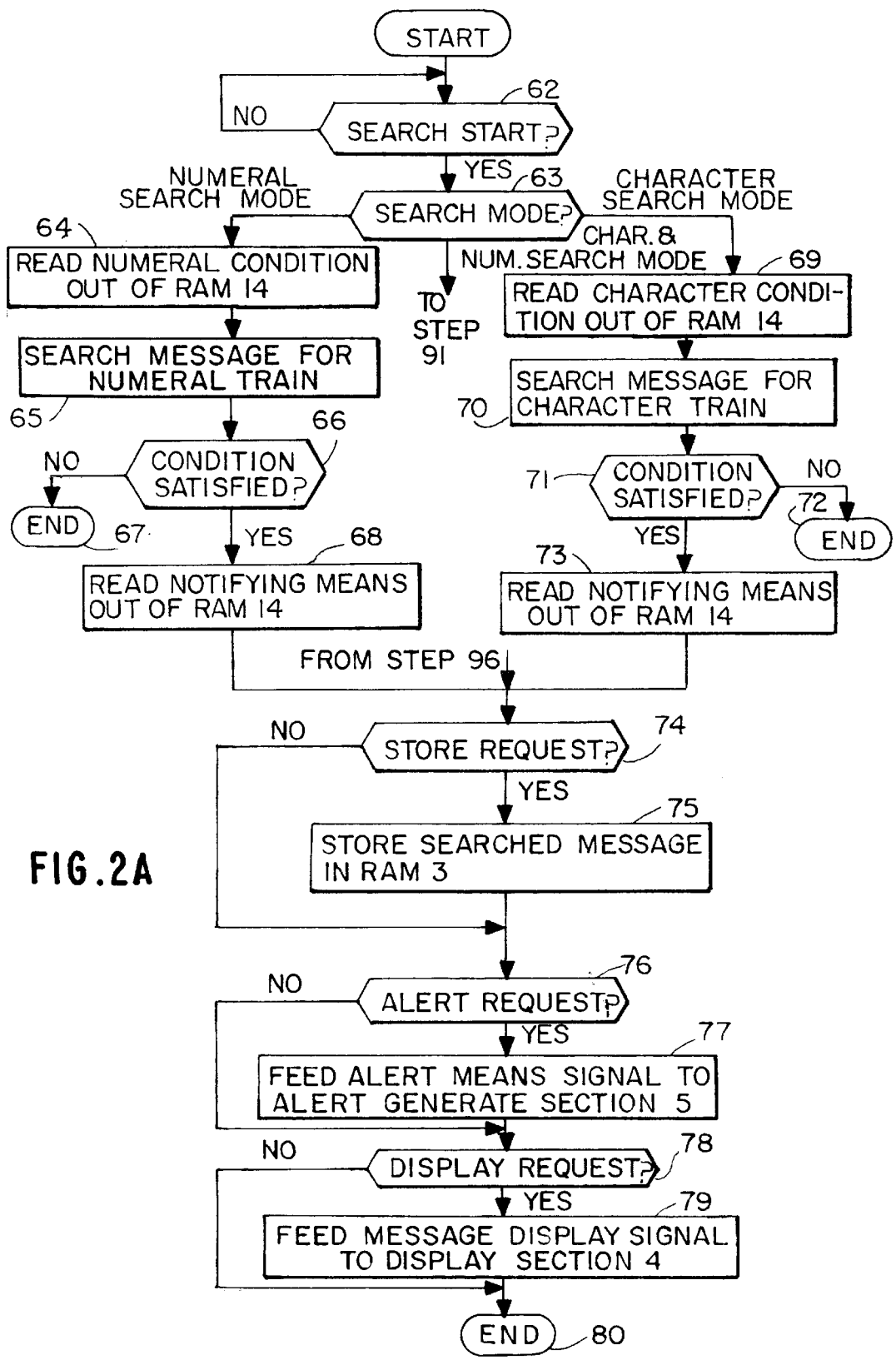

Referring to FIG. 2A, when a search start signal from the message decoding section 11 arrives in a step 62, the program advances to a step 63. So long as the search start signal does not arrive, the step 62 is repeated. If the search condition stored in the RAM 14 is a numeral search mode as decided in the step 63, a step 64 is executed for reading a numerical condition to be searched out of the RAM 14. This is followed by a step 65, i.e., searching for only a numerical data train out of the message from the RAM 12. At the next step 66, a numerical data train satisfying the above-mentioned numerical condition is searched for. If such a numerical data train is not found in the step 66, the program is transferred to a step 67 to end the processing. If a numerical data train satisfying the condition is found, a step 68 is executed for reading out from the RAM 14 particular notifying means which has been memorized on the basis of the previously stated search condition.

In the subsequent step 74, the present/absence of a message store request is determined by checking the RAM 14. If a message store request is present at 74, the searched message is stored in RAM 3 with the associated alert means at step 75 and then a step 76 is executed. If such a request is absent the step 74 is immediately followed by the step 76. In the step 76, whether an alert generate request is present is decided on the basis of the content of the RAM 14 and, if it is present, the program advances to a step 77. In the step 77, an alert means drive signal or the first drive signal for driving the alert generating means which has been selected by the step 67, followed by a step 78. If the alert generate request is absent as decided in the step 76, the program is directly transferred to the step 78. In the step 78, if a display request associated with the display section 4 is present is decided by referencing the RAM 14 and, if it is present, a step 79 is executed for delivering a message display signal or the second drive signal to the display section 5. If the display request is absent, the operation advances directly to the step 80 to complete the processing.

In the search mode selected is a character search mode as decided in the step 63, substantially the same sequence of steps as the steps described above in relation to a numeral search mode are performed. Specifically, a step 69 is executed for reading a character condition to be searched out of the RAM 14. This is followed by a step 70, i.e., searching for only a character data train out of the message from the RAM 12. At the next step 71, a character data train satisfying the above-mentioned character condition is searched for. If such a character data train is not found in the step 71, the program is transferred to a step 72 to end the processing. If a character data train satisfying the condition is found, a step 73 is executed for reading out from the RAM 14 particular notifying means which has been memorized on the basis of the previously stated search condition. The step 73 is followed by the step 74 after which the same steps as the numerical search mode are executed.

Further, in the character and numeral search mode as decided in the step 63, the program is transferred to a step 91 shown in FIG. 2B for reading a character condition to be searched out of the RAM 14. In FIG. 2B, a step 92 is executed after the step 91 for reaching a numerical condition out of the RAM 14. This is followed by a step 93 for searching for a character data train and a numeral data train out of the message stored in the RAM 12 and, then, by a step 94 for searching for a character data train and a numeral data train which satisfy both of the character and numerical conditions loaded in the RAM 14. In the next step 96, a notifying means associated with the searched character data train and numeral data train is read out of the RAM 14 and, then, a step 74 (FIG. 2A) is executed. If the character data train and numeral data train which satisfy the condition are not found in the step 94, the program is transferred to a step 95 to end the processing.

When no particular search condition is entered on the keyboard 2, the steps 91 to 96 shown in FIG. 2B are executed. In this case, a condition that all the character and numerical data trains should be searched will be set in the step 94.

Referring to FIGS. 3A, 3B, 4A and 4B, there are shown practical examples of a character message and a numerical message together with a method of searching them. Assume that a message information offerer (firm) transmits a message "NETWORK TROUBLE OCCURRED" shown in FIG. 3A for informing the user of the paging receiver that some trouble occurred. The user, on the other hand, loads the receiver with a character condition "TROUBLE" to be searched for, as shown in FIG. 3B. In this condition, the receiver searches for a character data train "TROUBLE" out of a received message in the step 71 of the character search mode flow shown in FIG. 2A. When the receiver has found the character data train "TROUBLE", it displays the message "NETWORK TROUBLE OCCURRED" and/or generates an alert.

On the other hand, assume that a stock information offerer (firm) offers the user of the paging receiver stock information such as shown in FIG. 4A, that the stock information is constituted by "stock or security name" and "stock price" which occur in this order, and that the stock or security name is variable in length while the stock price is preceded by a symbol "$" and followed by a symbol "*". In this case, the user of the receiver enters a character and numeral (alphanumeric) search conditions "NEC≧150" shown in FIG. 4B on the keyboard 2. Then, the receiver searches the stock information in the step 94 of the character and numeral search flow shown in FIG. 2B. More specifically, the receiver searches for the stock name "NEC" and then, based on the numerical search condition "≧150", the stock price "151" which is sandwiched between the symbols "$" and "*", out of the received stock information. Since the stock name "NEC" and stock price "151" satisfy the search condition "NEC" and "≧150", respectively, the receiver displays the message "NEC $151*", produces an alert and/or stores the message in the memory.

Figure 5A:
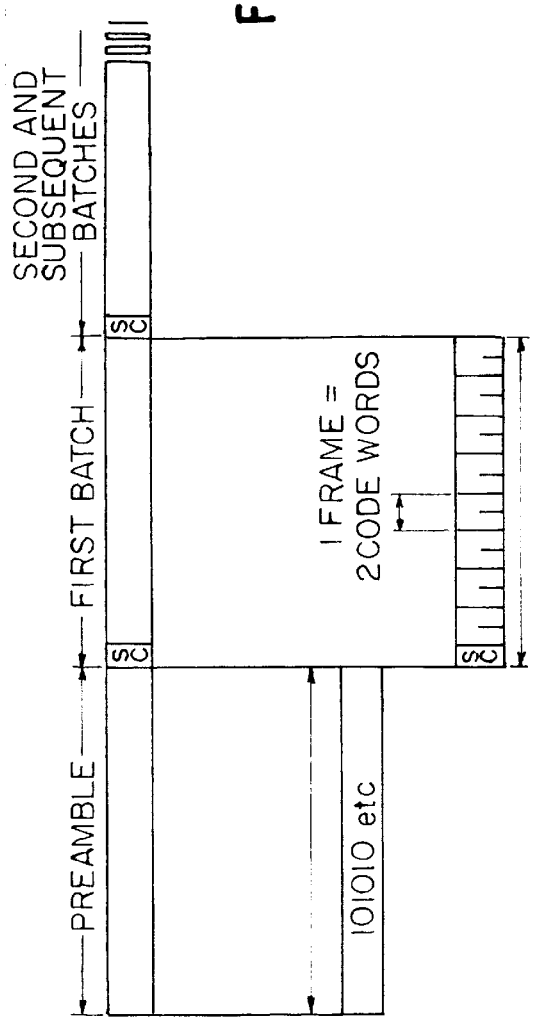
FIGS. 5A and 5B show a code format which is applicable to the present invention.

As regards the signal format for the transmission of a character and numeral message, the illustrative embodiment uses the POCSAG Digital Paging Signal format which is well known in the art. As shown in FIG. 5A, this kind of signal consists of a preamble having at least 576 bits of repetitive ONEs and ZEROs and at least one, usually a plurality of, batches which follow the preamble and are associated with the amount of message information transmitted. Each batch begins with one codeword of SC (Synchronization Codeword) and has sixteen codewords (i.e., eight frames) which follow the SC.

Figure 5B:
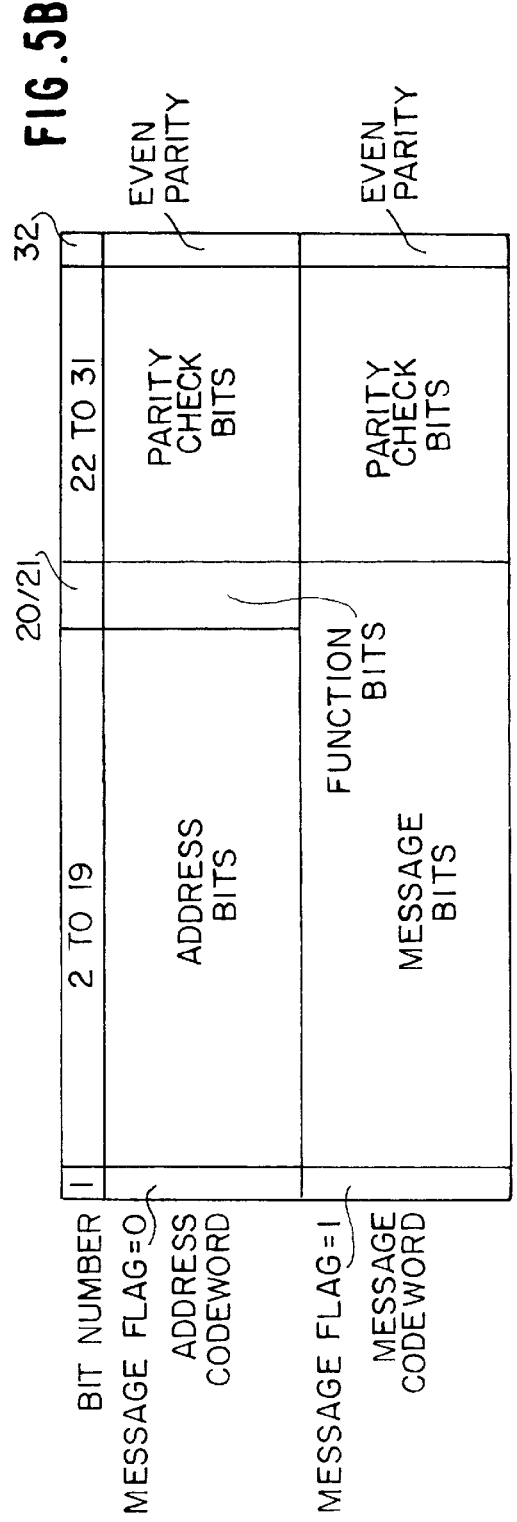

FIG. 5B shows the format of a codeword mentioned above. As shown, thirty-two bits are assigned to one codeword. Concerning an address codeword, a message flag is assigned to a bit No. 1, address bits adapted for a paying number are assigned to bit Nos. 2 to 19, function bits are assigned to bit Nos. 20 and 21, parity check bits are assigned to bit Nos. 22 to 31, and an even parity bit is assigned to a bit No. 32. In the case of a message codeword, a message flag, message bits, parity check bits and even parity bit are assigned to the bit No. 1, bit Nos. 2 to 21, bit Nos. 22 to 31 and bit No. 32, respectively.

The stock information stated earlier, for example, is assigned to the message codeword. FIGS. 6A to 6C show bit arrangements for transmitting stock information, taking the stock information of FIG. 4A for example. Let it be assumed that the message characters showing the stock name and price are implemented by an alphanumeric character set shown in Table 1 below (ASCII 7-bit code; CCITT international alphabet No. 5).

TABLE 1

| Bit No. 7 | | 0 | 0 | 0 | 0 | 1 | 1 | 1 | 1 |
|---|---|---|---|---|---|---|---|---|---|
| Bit No. 6 | | 0 | 0 | 1 | 1 | 0 | 0 | 1 | 1 |
| Bit No. 5 | | 0 | 1 | 0 | 1 | 0 | 1 | 0 | 1 |
| Bit No. 4321 | | | | | | | | | |
| 0000 | NUL | DLE | SP | 0 | @ | P | | P | |
| 0001 | SOH | DC1 | ! | 1 | A | Q | a | q | |
| 0010 | STX | DC2 | " | 2 | B | R | b | r | |
| 0011 | EXT | DC3 | # | 3 | C | S | c | s | |
| 0100 | EOT | DC4 | $ | 4 | D | T | d | t | |
| 0101 | ENQ | NAK | % | 5 | E | U | e | u | |
| 0110 | ACK | SYN | & | 6 | F | V | f | v | |
| 0111 | BEL | ETB | ' | 7 | G | W | g | w | |
| 1000 | BS | CAN | ( | 8 | H | X | h | x | |
| 1001 | HT | EM | ) | 9 | I | Y | i | y | |
| 1010 | LF | SUB | * | : | J | Z | j | z | |
| 1011 | VT | ESC | + | ; | K | [ | k | | |
| 1100 | FF | IS(FS) | ' | | L | | l | 1 | |
| 1101 | CR | IS(GS) | – | = | M | ] | m | | |
| 1110 | SO | IS(RS) | . | | N | | n | | |
| 1111 | SI | IS(US) | / | ? | 0 | | o | DEL | |

FIGS. 6A, 6B, and 6C show respectively the bit construction of a first message in a frame 1 of the first batch, the bit construction of a second message in a frame 1 of the first batch, and the bit construction of a first message codeword in the frame 2 of the first batch.

In summary, in accordance with the present invention, a message received by a paging receiver is compared on the basis of a particular condition set by a user of the receiver so that the storage of the message in a memory, generation of an alert and the like are controlled depending upon the result of comparison. This allows the user to readily select and therefore immediately see only a desired one of incoming information. Especially, when the receiver receives information which is offered to many and unspecified users such as stock quotes there can be realized a function of storing only a message containing only a desired issue, a function of energizing a speaker only when the price of a desired stock or security has gone up beyond a certain price, and a function of simply storing a message in other conditions.

What is claimed is:

1. A paging receiver comprising:

receiving means for receiving a call signal and a message signal following the call signal to produce a received call signal and a received message signal;

detecting means connected to the receiving means for detecting said call signal to produce a first coincide signal;

message control means, responsive to the first coincide signal, for processing said received message signal following said call signal to determine if said received message signal is desired by a user, the message control means including, (A) input means for inputting process information and store request information, relative to said received message signal such that said process information and said store request information are independently input by the user;

(B) first memory means connected to the input means for storing the process information and the store request information, said process information to be used for indicating whether the received message signal is desired by the user and said store request information used for indicating whether to store said received message signal indicated as desired by the user;

(C) second memory means for temporarily storing the received message signal;

(D) comparison means connected to the first memory means and to the second memory means for comparing a part of the received message signal temporarily stored in the second memory means with the process information, and if the received message signal temporarily stored in the second memory means satisfies the process information, then outputting a second coincide signal, thereby indicating that the received message signal is desired by the user;

(E) read means for reading the store request information stored in said first memory means if the received message signal temporarily stored in the second memory means satisfies the process information; and (F) third memory means, responsive to the second coincide signal, for storing therein said received message signal temporarily stored in the second memory means, only when the store request information is present; and informing means responsive to the second coincide signal for informing the user of the desired, received message signal.

2. A paging receiver as claimed in claim 1, wherein said informing means comprising:

an alert device; and alert device driving means responsive to the second coincide signal for driving the alert device to generate an alert.

3. A paging receiver as claimed in claim 2, further comprising display means, responsive to the second coincide signal, for displaying the received message signal temporarily stored in the second memory means.

4. A paging receiver as claimed in claim 1, wherein said process information comprises character data and numerical data, respectively, which are separately searchable to enable said user to select only those of said received message signals, having a particular character string and particular numerical characteristics related to said particular character string, which are desired by the user.

5. A paging receiver comprising:

receiving means for receiving a call signal and a message signal following the call signal to produce a received call signal and a received message signal;

detecting means connected to the receiving means for detecting said call signal to produce a first coincide signal;

message control means coupled to the detecting means for processing said received message signal following said call signal to determine if said received message signal is desired by a user; and a plurality of alerting devices, responsive to an alert signal, for generating an alert;

said message control means including, (A) input means for inputting process information having search information, notifying information, and store request information, relative to said received message signal, such that said process information, said notifying information, and said store request information are independently input by the user;

(B) first memory means coupled to the input means for storing the process information, the notifying information, and the store request information, said process information to be used for indicating whether the received message signal is desired by the user, said notifying information to be used for indicating whether said alert is desired by the user, and said store request information used for indicating whether to store said received message signal indicated as desired by the user;

(C) second memory means for temporarily storing the received message signal;

(D) comparison means coupled to the first memory means and to the second memory means for comparing a part of the received message signal temporarily stored in the second memory means with the search information, and if the received message signal temporarily stored in the second memory means satisfies the search information, then outputting a second coincide signal, thereby indicating that the received message signal is desired by the user; and (E) alert signal producing means, responsive to the second coincide signal, for selectively producing the alert signal corresponding to the notifying information stored in the first memory means.

6. A paging receiver as claimed in claim 5, wherein one of said plurality of alerting devices comprises a speaker which sounds in response to said alert signal.

7. A paging receiver as claimed in claim 5, wherein one of said plurality of alerting devices comprises a light emitting diode which emits light in response to said alert signal.

8. A paging receiver as claimed in claim 5, wherein one of said plurality of alerting devices comprises a vibrator which vibrates in response to said alert signal.

9. A paging receiver as claimed in claim 5, wherein said process information comprises character data and numerical data, respectively, which are separately searchable to enable said user to select only those of said received message signals, having a particular character string and particular numerical characteristics related to said particular character string, which are desired by the user.

10. A paging receiver comprising:

receiving means for receiving a call signal and a message signal following the call signal to produce a received call signal and a received message signal;

detecting means connected to the receiving means for detecting said call signal to produce a first coincide signal;

message control means connected to the detecting means, and responsive to the first coincide signal, for processing said received message signal following said call signal to determine if said received message signal is desired by a user; and alert generating means connected to the message control means for alerting reception of the call;

said message control means includes:

(A) input means for inputting process information, notifying information, and store request information, relative to said received message signal such that said process information, said notifying information, and said store request information are independently input by the user;

(B) first memory means connected to the input means for storing the process information, the notifying information, and the store request information, said process information to be used for indicating whether the received message signal is desired by the user, said notifying information to be used for indicating whether said alert is desired by the user, and said store request information used for indicating whether to store said received message signal indicated as desired by the user;

(C) second memory means for temporarily storing the received message signal;

(D) comparison means coupled to the first memory means and to the second memory means for comparing a part of the received message signal temporarily stored in the second memory means with the process information and, if the received message signal temporarily stored in the second memory means satisfies the process information, then generating a second coincide signal, thereby indicating that the received message signal is desired by the user; and (E) deactivating means for deactivating a drive signal for activating the alert generating means, when the second coincide signal is not generated;

wherein the alert generating means alerts reception of a desired received message signal in a manner indicated by the notifying information.

11. A paging receiver as claimed in claim 10, wherein said alert generating means comprises a speaker which sounds in response to said drive signal.

12. A paging receiver as claimed in claim 10, wherein said alert generating means comprises a light emitting diode which emits light in response to said drive signal.

13. A paging receiver as claimed in claim 10, wherein said alert generating means comprises a vibrator which vibrates in response to said drive signal.

14. A paging receiver as claimed in claim 10, wherein said process information comprises character data and numerical data, respectively, which are separately searchable to enable said user to select only those of said received message signals, having a particular character string and particular numerical characteristics related to said particular character string, which are desired by the user.

* * * * *

UNITED STATES PATENT AND TRADEMARK OFFICE
CERTIFICATE OF CORRECTION

PATENT NO.   : 5,844,498
DATED        : December 1, 1998
INVENTOR(S)  : Motoki IDE It is certified that error appears in the above-indentified patent and that said Letters Patent is hereby corrected as shown below:

On the title page: Item [30]

In the Foreign Application Priority Data, delete "1-286751" and insert --62-286751".

Signed and Sealed this

Ninth Day of November, 1999

Attest:

Q. TODD DICKINSON

Attesting Officer

Acting Commissioner of Patents and Trademarks